(12) United States Patent
Hofmann et al.

(10) Patent No.: US 6,551,190 B2
(45) Date of Patent: Apr. 22, 2003

(54) WHEEL BEARING WITH POSITIVE-LOCKING CONNECTION

(75) Inventors: Heinrich Hofmann, Schweinfurt (DE); Peter Niebling, Bad Kissingen (DE); Peter Kleinmann, Schwanfeld (DE)

(73) Assignee: FAG Automobiltechnik AG (DE)

(*) Notice: Subject to any disclaimer, the term of this patent is extended or adjusted under 35 U.S.C. 154(b) by 0 days.

(21) Appl. No.: 10/004,419

(22) Filed: Nov. 2, 2001

(65) Prior Publication Data

US 2002/0082094 A1 Jun. 27, 2002

(30) Foreign Application Priority Data

Nov. 3, 2000 (DE) .......................................... 100 54 421

(51) Int. Cl.[7] .......................... F16D 3/224; F16C 13/00
(52) U.S. Cl. ...................... 464/178; 464/145; 464/906; 384/544; 180/259
(58) Field of Search .................................. 464/139, 143, 464/906, 145, 178; 180/259; 384/544

(56) References Cited

U.S. PATENT DOCUMENTS

| | | | | |
|---|---|---|---|---|
| 4,090,751 A | * | 5/1978 | Krude .......................... 384/498 |
| 4,359,128 A | * | 11/1982 | Krude .......................... 180/258 |
| 4,405,032 A | * | 9/1983 | Welschof et al. ........... 180/259 |
| 4,417,643 A | * | 11/1983 | Guimbretiere ............... 180/254 |
| 4,473,129 A | * | 9/1984 | Guimbretiere ............... 180/254 |
| 4,775,190 A | * | 10/1988 | Jacob .......................... 301/126 |

* cited by examiner

Primary Examiner—Lynne H. Browne
Assistant Examiner—Kenn Thompson
(74) Attorney, Agent, or Firm—Ostrolenk, Faber, Gerb & Soffen, LLP

(57) ABSTRACT

A wheel bearing with an integrated constant velocity joint. The joint has a sheet-metal outer ring. Drive torque is transmitted from the outer ring of the constant velocity joint to the inner ring flange of a surrounding bearing by a tooth system. The tooth system is formed in the inner ring flange in such a way that it supports a wavelike outer contour of the outer ring of the constant velocity joint over a defined circumferential length section of the outer ring. The outer ring of the joint has tracks that mesh with the tooth system. The ends of the tracks are bent inward away from the tooth system.

5 Claims, 4 Drawing Sheets

Detail "X"

WHEEL BEARING WITH POSITIVE-LOCKING CONNECTION

FIELD OF THE INVENTION

The invention relates to a wheel bearing and a constant velocity joint, wherein the outer ring of the constant velocity joint is connected to the inner ring flange of the wheel bearing via a positive-locking connection to transmit torque from the constant velocity joint to the wheel bearing via this positive-locking connection.

BACKGROUND OF THE INVENTION

Integration of parts and an associated demand for lightweight construction are long known requirements in automobile construction. This also applies to the wheel bearing arrangement and to the attempt to integrate as many functions as possible into the wheel bearing arrangement from its surroundings.

Intensive effort has been made in integrating a constant velocity joint into a wheel bearing. A construction unit comprising a constant velocity joint and a wheel bearing is shown in DE 23 29 554 A1. The constant velocity joint is of a solid type of construction and is connected directly to the inner ring flange via a splined shaft profile. There are problems with this design. The solid construction of the outer ring of the constant velocity joint, in combination with the additional splined shaft profile, has a very large diameter. As a result, the wheel bearing lying on the outside has to be of large design. A further problem is that the tooth system extends over the entire axial length of the constant velocity joint. This prevents the outer ring of the constant velocity joint from yielding elastically in the face of the deformations which occur, due to the production tolerances in the tracks of the balls of the constant velocity joint. These constraining forces lead to additional undesirable heating in the constant velocity joint and to increased wear.

A constant velocity joint having opposed curved tracks is shown in DE 19831012 A1. This constant velocity joint has a flange for transmitting the torque. Since this constant velocity joint is designed as a sheet-metal part in a light-weight type of construction, it also requires a second small flange in order to achieve sufficient rigidity. This constant velocity joint with opposed tracks is therefore arranged next to the wheel bearing when it is fitted in place.

OBJECT OF THE INVENTION

The object of the invention is to provide a novel connection between the wheel bearing and the constant velocity joint, which connection meets the requirements for lightweight construction, is simple to produce and avoids constraining forces in the constant velocity joint.

DESCRIPTION OF THE INVENTION

A constant velocity joint is located inside the inner ring flange of the wheel bearing around the joint. According to the invention, there is a tooth system inside the inner ring flange of the outer surrounding wheel bearing, to which the torque is transmitted. The teeth of the tooth system extend axially across the inner ring flange, and have circumferentially leading and trailing tooth flanks. The tooth system is designed to mesh with the generally complementary contours of the sheet-metal outer ring of the constant velocity joint in defined sections so that those elements rotate together. These contours of the outer ring of the joint are obtained during the sheet-metal working. The tooth system does not come in contact in the end region of the track running radially inward.

There are surprising advantages of this tooth system located in the inner ring flange.

The outer contour of the outer ring of the constant velocity joint, which contour is obtained during the sheet-metal working for producing the tracks for the torque transmitting balls in the outer ring of the joint, is utilized for the transmission of the torque from the constant velocity joint to the wheel bearing. This provides a construction which is light weight and which has a small diameter because the additional tooth system shown in the prior art is dispensed with. Further production operations on the outer contour of the outer ring of the constant velocity joint are therefore unnecessary.

The flanges shown in the constant velocity joint in DE 198 31 012 A1 located on the outer ring of the constant velocity joint can be dispensed with. The task of the larger flange is to transmit the torque, and the task of the second flange is to increase the rigidity of the outer ring of the constant velocity joint. This necessary rigidity of the outer ring of the constant velocity joint is now replaced by the tooth system in the inner ring flange. In this case, the tooth system in the inner ring flange supports the outer ring of the constant velocity joint only at the flanks, i.e., the circumferentially leading and trailing surfaces, of the tracks of the outer ring of the joint. That end of each track which runs radially inward is exposed. There is the requisite elasticity of the outer ring of the constant velocity joint in order to keep all the torque transmitting ball bearings uniformly in the tracks in a pivoted constant velocity joint. The elasticity in this case is required in order to compensate for production tolerances in the constant velocity joint.

Due to the tooth system meshing in sections only between the wheel bearing and the constant velocity joint, heat transfer between these components is reduced. This has a positive effect on the service life, particularly of the wheel bearing.

The tooth system in the inner ring flange is simple to produce. This tooth system can be produced during cold or hot working for producing the inner ring flange. Broaching or milling processes are also suitable for producing this tooth system. Due to the design of the tooth system (e.g. straight or curved) in the inner ring flange, the position of the torque-transmitting area between the outer ring of the constant velocity joint and the tooth system of the inner ring joint can be freely selected.

DETAILED DESCRIPTION OF PREFERRED EMBODIMENTS

Figure 1:
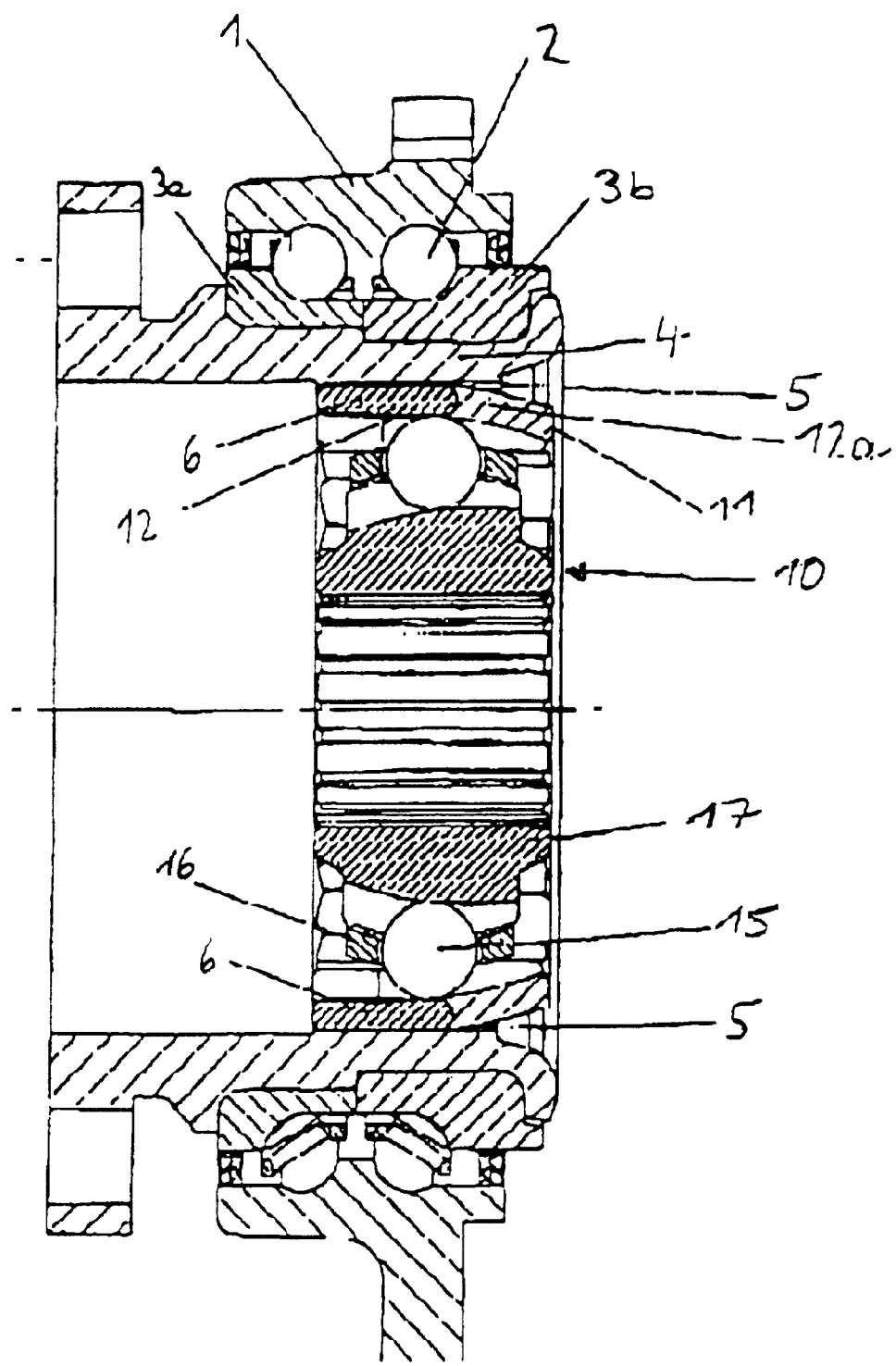
FIG. 1 shows a sectional view of a wheel bearing with a constant velocity joint having tracks running in the same direction.

FIG. 1 shows a wheel bearing unit with a constant velocity joint 10. The wheel bearing unit shown has an outer ring flange 1, two rows of rolling bodies 2 inside the outer ring flange, and two inner rings 3a and 3b inward of the rolling bodies, one inner ring for each row of rolling bodies. The inner rings are held together by the inner ring flange 4 inward of the inner rings. Wheel bearing variants in which one or both inner ring raceways of inner rings 3a and 3b are integrated directly in the inner ring flange are not shown, since the arrangement of the raceways either in individual inner rings or directly on the inner ring flange does not affect the invention. In the other Figures hereof, only the inner ring flange 4 of the wheel bearing is shown, since the latter inner ring flange contains the features of the invention.

There is a constant velocity joint 10 comprising an inner part 17, a cage 16 outward of the part 17, a row of torque transmitting bearing balls 15 and an outer ring 11. The ring 11 is arranged inside the inner ring flange 4. The outer ring 11 is designed as a sheet-metal part. It is provided with axially directed tracks 12 running in the same direction, and tracks in FIG. 1 are all inclined inward in one direction at region 12a.

A tooth system 5 on the inside of the inner ring flange projects between the shaped portions of the tracks 12 of the outer ring 11 of the constant velocity joint 10. The teeth of the tooth system are also axially extending. There is a bearing area 6 between the tooth flanks and the tooth system where the leading and trailing flanks of the tooth system and the flanks engage for torque transmission. An elastically movable region 12a of the track 12 to the lateral side of the row of balls 15 is not touched by the tooth system 5 as the region 12a turns inward radially.

The balls 15 of the constant velocity joint 10 move along the tracks in the outer ring of the joint and into the region 12a during cornering and/or during spring deflection of the wheel into this region.

Figure 2:
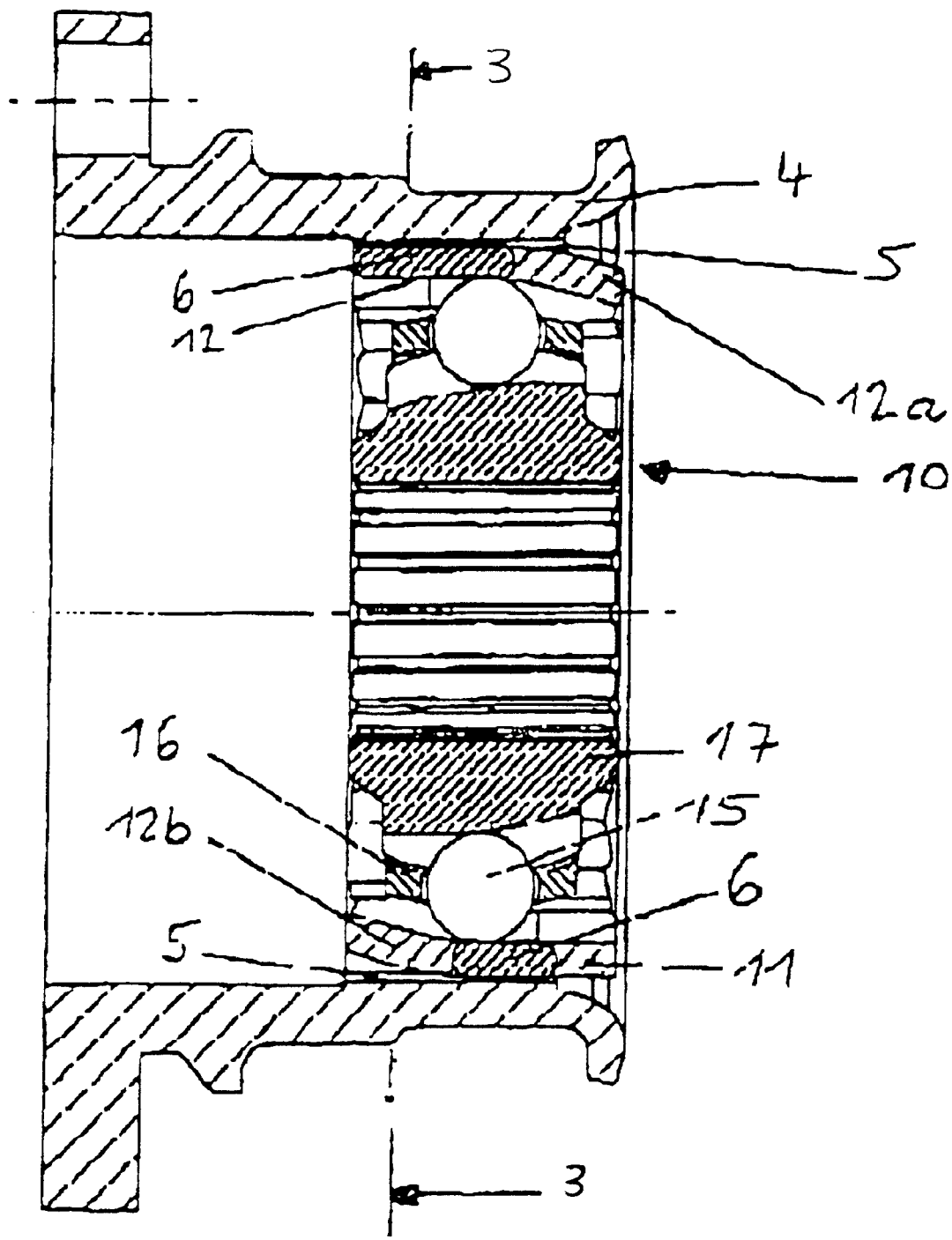
FIG. 2 shows a sectional view of an inner ring flange of a wheel bearing with a constant velocity joint having opposed tracks.

FIG. 2 shows an inner ring flange 4 with a constant velocity joint having tracks 12 curved alternately in opposite directions. The tooth system 5 of the inner ring flange 4 bears on the outer contour of the outer ring 11 of the constant velocity joint 10 in the region 6 (wavelike, hatched). Because the individual track end regions 12a, 12b are curved alternately in opposite axial directions, the bearing region 6 is axially offset between two tracks lying side by side. Therefore the elastic region 12a or 12b of each track 12, on which region the tooth system 5 of the inner ring flange does not bear, is likewise axially offset between two tracks. The inner part 17, the cage 16 and the balls 15 of the constant velocity joint 10 are shown.

Figure 3:
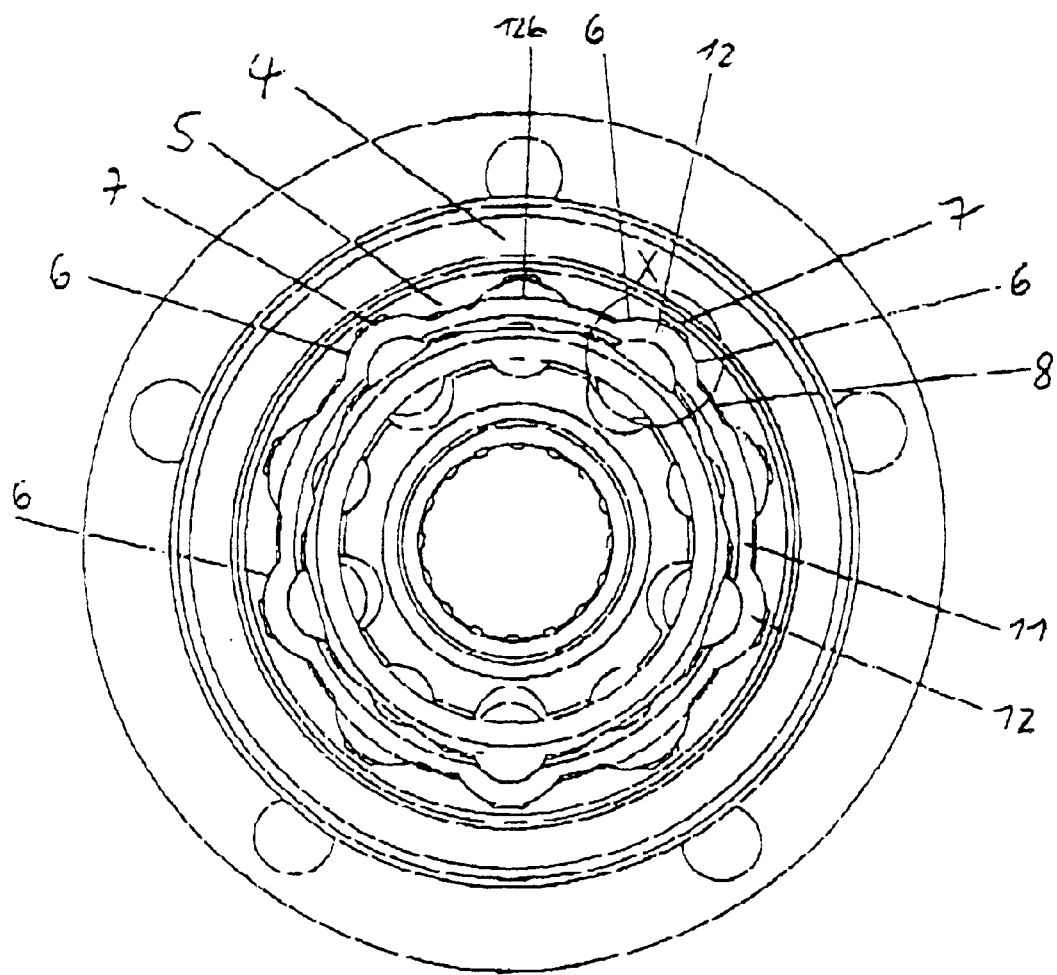
FIG. 3 shows a wheel flange with a tooth system and a constant velocity joint in a cross-sectional plan view on 3—3 in FIG. 2.
Figure 4:
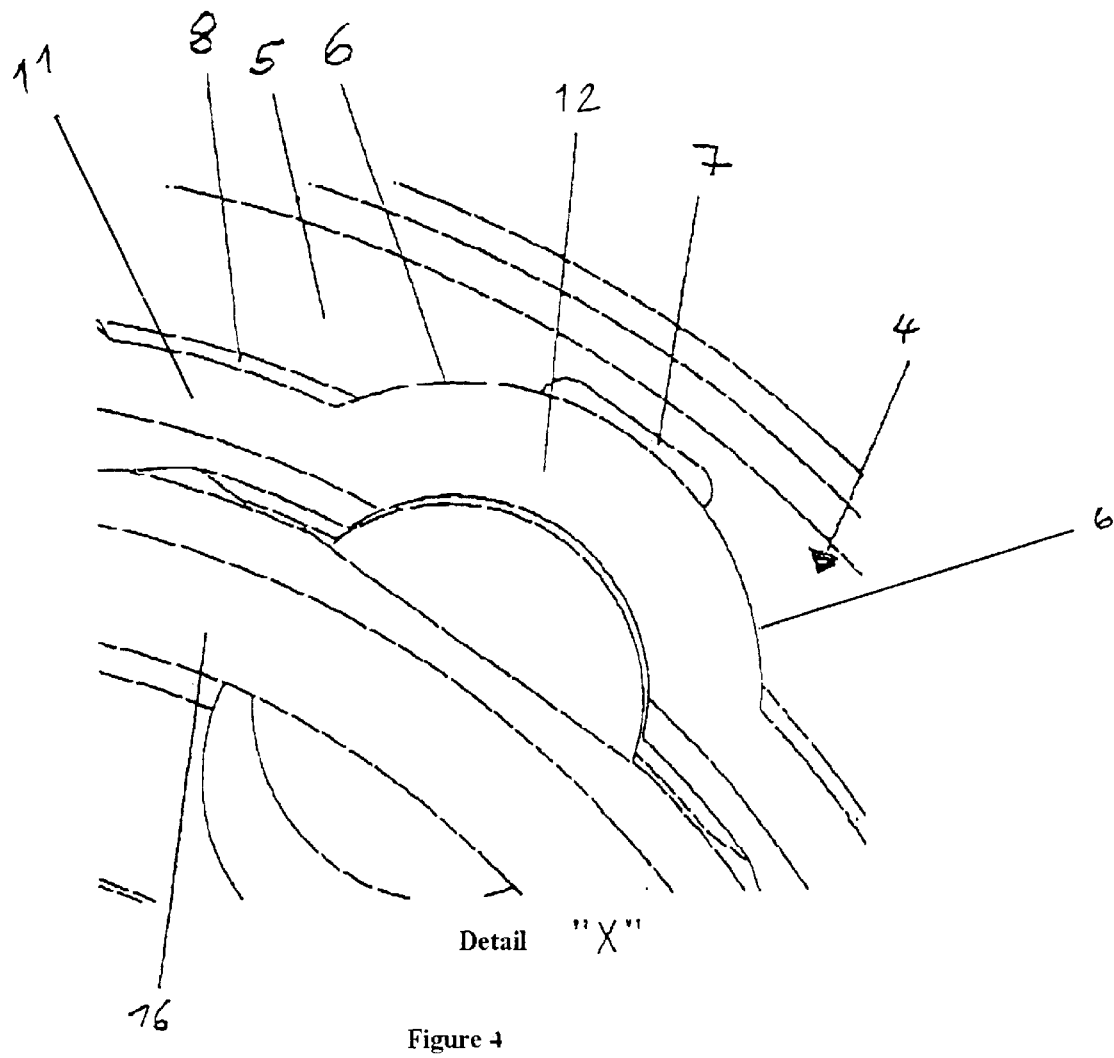
FIG. 4 shows an enlarged detail FIG. 3 showing of a tooth system between the inner ring flange and the outer ring of the constant velocity joint.

The inner ring flange 4 of the bearing, the outer ring 11 of the joint 10, the inner part 17, the balls 15 and the cage 16 of the constant velocity joint with opposed tracks are shown in FIG. 3 and FIG. 4 (in the enlarged detail). The sectional plane of the plan view is indicated at 3—3 in FIG. 2. The interaction of the tooth system 5 of the inner ring flange 4 with the outer contour of the outer ring 11 of the constant velocity joint 10 is shown in these sectional views. The bearing region 6 of the tooth system on the generated surface of the track 12 is shown. In this case, the contour of the tooth system in the inner ring flange is adapted to the generated surface of the track 12. The non-bearing regions 7 and 8 of the tooth system 5 are likewise shown. The task of these two non-bearing regions is not to load or deform the outer ring 11 of the constant velocity joint in regions which are not required for a positive-locking transmission of the torque. The flanks of the tracks 12 that are touched by the fit of the tooth system 5 totals less than 70% of the total length of the track in the circumferential direction. The opposed track 12 having the elastic region 12b is shown at a distance opposite the tooth system 5. The cross-sectional plan view of FIG. 3, therefore, shows tracks which bear on the tooth system and tracks having an elastic region 12b which is located at a distance opposite the tooth system and these tracks alternate.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A wheel bearing for motor vehicles, comprising:

a bearing having a first outer ring, rolling elements inside the outer ring and an inner ring flange inward of the rolling elements; the inner ring flange having a radially inner side;

a constant velocity joint lying inside the inner ring flange of the bearing, the joint having a second respective outer ring;

a tooth system on the inner side of the inner ring flange, the tooth system including teeth arrayed around the inner ring flange and connecting the inner ring flange of the bearing with the second outer ring of the joint in a positive-locking manner;

the second outer ring of the constant velocity joint comprising a sheet-metal part having a wavelike generated surface with at least one track thereon that extends in a direction across the second outer ring, the track having at least one section that touches the tooth flanks of the tooth system of the inner ring flange in a fitted manner to transmit torque between the joint second outer ring and the bearing inner ring flange; each track having an end region located at a distance radially inward from and opposite the inner ring flange for permitting deformability of the constant velocity joint in the end region of the track.

2. The wheel bearing of claim 1, wherein the second outer ring of the constant velocity joint includes a plurality of the tracks running in the same direction.

3. The wheel bearing of claim 1, wherein the second outer ring of the constant velocity joint includes a plurality of the tracks running in opposite directions.

4. The wheel bearing of claim 1, wherein the second outer ring has a wavelike generated outer surface with flanks on the tracks at the outer surface wherein the surface is obtained during plastic shaping of the tracks, the wavelike surface being utilized for torque transmission to the flanks of the tracks.

5. The wheel bearing as claimed in claim 1, wherein the circumferential direction length of the at least one section in which the flanks of the tracks are touched by the fit of the tooth system is less than 70% of the total circumferential direction length of the track.

* * * * *